US012150408B2

(12) United States Patent
Farley et al.

(10) Patent No.: US 12,150,408 B2
(45) Date of Patent: Nov. 26, 2024

(54) SELF-SUPPORTING HARVESTER HEADER SYSTEM

(71) Applicant: CNH Industrial America LLC, New Holland, PA (US)

(72) Inventors: Herbert M. Farley, Elizabethtown, PA (US); Cory D. Hunt, Millersville, PA (US)

(73) Assignee: CNH Industrial America LLC, Holland, PA (US)

( * ) Notice: Subject to any disclaimer, the term of this patent is extended or adjusted under 35 U.S.C. 154(b) by 821 days.

(21) Appl. No.: 17/293,658

(22) PCT Filed: Nov. 7, 2019

(86) PCT No.: PCT/US2019/060193
§ 371 (c)(1),
(2) Date: May 13, 2021

(87) PCT Pub. No.: WO2020/101992
PCT Pub. Date: May 22, 2020

(65) Prior Publication Data
US 2022/0007575 A1    Jan. 13, 2022

Related U.S. Application Data

(60) Provisional application No. 62/768,544, filed on Nov. 16, 2018.

(51) Int. Cl.
*A01D 41/14* (2006.01)
(52) U.S. Cl.
CPC ......... *A01D 41/141* (2013.01); *A01D 41/145* (2013.01)
(58) Field of Classification Search
CPC .......................... A01D 41/141; A01D 41/145
See application file for complete search history.

(56) References Cited

U.S. PATENT DOCUMENTS

| 4,206,582 A * | 6/1980 | Molzahn | A01D 57/00 56/15.8 |
| 4,507,910 A * | 4/1985 | Thornley | A01D 57/00 56/DIG. 15 |

(Continued)

FOREIGN PATENT DOCUMENTS

| CA | 3079285 A1 * | 10/2020 | A01D 34/04 |
| DE | 102020204861 A1 * | 10/2020 | A01D 34/04 |

(Continued)

OTHER PUBLICATIONS

International Search Report for PCT application PCT/US2019/060193, mailed Apr. 24, 2020 (12 pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

A header of a harvester includes a first header segment comprising a cutter bar configured to cut crops, and a first portion of a conveyor assembly. The header additionally includes a center section including a second portion of the conveyor assembly. The center section is configured to receive cut crops from the first header segment via the first portion of the conveyor assembly. The header also includes a first ground engaging element configured to at least partially support a weight of the header, and a first sensor configured to output a signal indicative of a distance to ground. The header further includes a first actuator; and a control system comprising a processor configured to receive a sensor signal from the first sensor and to control the first actuator to adjust the first ground engaging element based on the sensor signal.

20 Claims, 9 Drawing Sheets

(56) References Cited

U.S. PATENT DOCUMENTS

| | | | |
|---|---|---|---|
| 5,562,167 A * | 10/1996 | Honey | A01B 73/00 |
| | | | 172/385 |
| 6,789,379 B2 * | 9/2004 | Heidjann | A01D 41/12 |
| | | | 56/10.2 E |
| 7,540,130 B2 * | 6/2009 | Coers | A01D 41/141 |
| | | | 56/228 |
| 7,661,251 B1 * | 2/2010 | Sloan | A01D 41/145 |
| | | | 60/413 |
| 7,971,420 B1 * | 7/2011 | Bollin | A01D 41/145 |
| | | | 56/208 |
| 8,833,481 B2 | 9/2014 | Blunier et al. | |
| 8,942,893 B2 | 1/2015 | Rosa et al. | |
| 9,125,343 B2 * | 9/2015 | Duquesne | A01D 41/12 |
| 9,668,412 B2 * | 6/2017 | Ritter | A01D 41/141 |
| 9,775,291 B2 | 10/2017 | Neudorf | |
| 9,992,924 B2 * | 6/2018 | van Vooren | A01D 41/144 |
| 10,827,677 B2 * | 11/2020 | Fay, II | A01D 41/145 |
| 2006/0242935 A1 * | 11/2006 | Rayfield | A01D 41/141 |
| | | | 56/10.2 E |
| 2010/0281837 A1 * | 11/2010 | Talbot | A01D 41/141 |
| | | | 56/10.2 E |
| 2014/0041351 A1 * | 2/2014 | Bollin | A01D 41/141 |
| | | | 56/10.2 E |
| 2015/0013795 A1 * | 1/2015 | Ritter | A01D 41/145 |
| | | | 137/596.16 |
| 2015/0033692 A1 * | 2/2015 | Schroeder | A01D 41/141 |
| | | | 56/10.2 E |
| 2015/0271999 A1 * | 10/2015 | Enns | A01D 41/145 |
| | | | 700/275 |
| 2016/0183461 A1 * | 6/2016 | Neudorf | A01D 41/145 |
| | | | 56/158 |
| 2018/0070531 A1 | 3/2018 | Long et al. | |
| 2018/0098491 A1 * | 4/2018 | Long | A01D 34/006 |
| 2018/0228080 A1 * | 8/2018 | Fay, II | A01D 34/243 |
| 2018/0332768 A1 * | 11/2018 | Isaac | A01D 41/06 |
| 2018/0368317 A1 * | 12/2018 | Schulze Selting | A01D 41/141 |
| 2019/0029173 A1 * | 1/2019 | Noll | A01D 41/127 |
| 2019/0029175 A1 * | 1/2019 | Talbot | A01D 41/148 |
| 2019/0059223 A1 * | 2/2019 | Seiders, Jr. | A01B 63/008 |
| 2019/0200523 A1 * | 7/2019 | Fay, II | A01D 41/141 |
| 2019/0230855 A1 * | 8/2019 | Reed | A01B 69/004 |
| 2020/0344950 A1 * | 11/2020 | Brimeyer | A01D 41/145 |
| 2020/0352101 A1 * | 11/2020 | Pierson | A01D 41/1274 |
| 2020/0390035 A1 * | 12/2020 | Hunt | A01D 41/141 |
| 2021/0153434 A1 * | 5/2021 | Hunt | A01D 41/127 |
| 2021/0185879 A1 * | 6/2021 | Hunt | A01D 41/144 |
| 2021/0185908 A1 * | 6/2021 | Hunt | A01D 41/1274 |
| 2021/0185915 A1 * | 6/2021 | Hunt | A01D 34/38 |
| 2021/0185918 A1 * | 6/2021 | Hunt | A01D 41/144 |
| 2022/0000019 A1 * | 1/2022 | Kemmerer | A01D 41/14 |
| 2023/0413709 A1 * | 12/2023 | Honey | A01B 63/22 |

FOREIGN PATENT DOCUMENTS

| | | | | |
|---|---|---|---|---|
| DE | 102021104432 A1 * | 8/2022 | | A01D 41/141 |
| EP | 2695511 A1 | 2/2014 | | |
| EP | 2832206 A1 | 2/2015 | | |
| EP | 3420797 A1 | 1/2019 | | |
| WO | 2019/023312 A1 | 1/2019 | | |
| WO | WO-2020101887 A1 * | 5/2020 | | A01D 41/14 |
| WO | WO-2022006280 A1 * | 1/2022 | | A01D 41/14 |

\* cited by examiner

SELF-SUPPORTING HARVESTER HEADER SYSTEM

BACKGROUND

The disclosure relates generally to a harvester. More specifically, the present disclosure relates to a self-supporting harvester header.

A harvester may be used to harvest agricultural crops, such as barley, beans, beets, carrots, corn, cotton, flax, oats, potatoes, rye, soybeans, wheat, or other plant crops. Moreover, a harvester (e.g., combine harvester) is a type of harvester generally used to harvest certain crops that include grain (e.g., barley, corn, flax, oats, rye, wheat, etc.). During operation of a harvester, the harvesting process may begin by removing a plant from a field, such as by using a header. The header may cut the agricultural crops and transport the cut crops to a processing system of the harvester.

Generally, the harvester may be driven through a field to collect and process crops. As the harvester encounters agricultural crops in the field, the header, which is positioned at a front of the harvester, cuts a portion of each crop. Certain components of the harvester, such as the header, may be adjustable to enhance performance of the harvester. For example, the header may cut crops encompassed within a spanned width of the header. In certain harvesters, the header may be separated into header segments, in which each header segment is configured to cut a portion of the crops encompassed by the width of the harvester. The header segments may also be configured to move (e.g., rotate) independently of one another to different positions, such as to enable the header to follow the contours of a field Unfortunately, when operating the header in a raised position, the segments may not be in contact with the field and as a result, are unable to follow the contour of the field to adjust their respective positions.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a header of a harvester, includes a header segment, a center section, an actuator coupling the header segment to the center section, and a controller. The header segment includes a cutter bar configured to cut crops and the header segment includes a first portion of a conveyor assembly. The center section includes a second portion of the conveyor assembly, in which the center section is configured to receive crops from the header segment via the first portion of the conveyor assembly, and the second portion of the conveyor assembly is configured to transport the received crops to a crop processing system of the harvester. The controller is configured to receive a signal indicative of a target position of the header segment relative to the center section and/or the ground and the controller is configured to control the actuator to adjust the header segment to the target position.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE DRAWINGS

Figure 1:
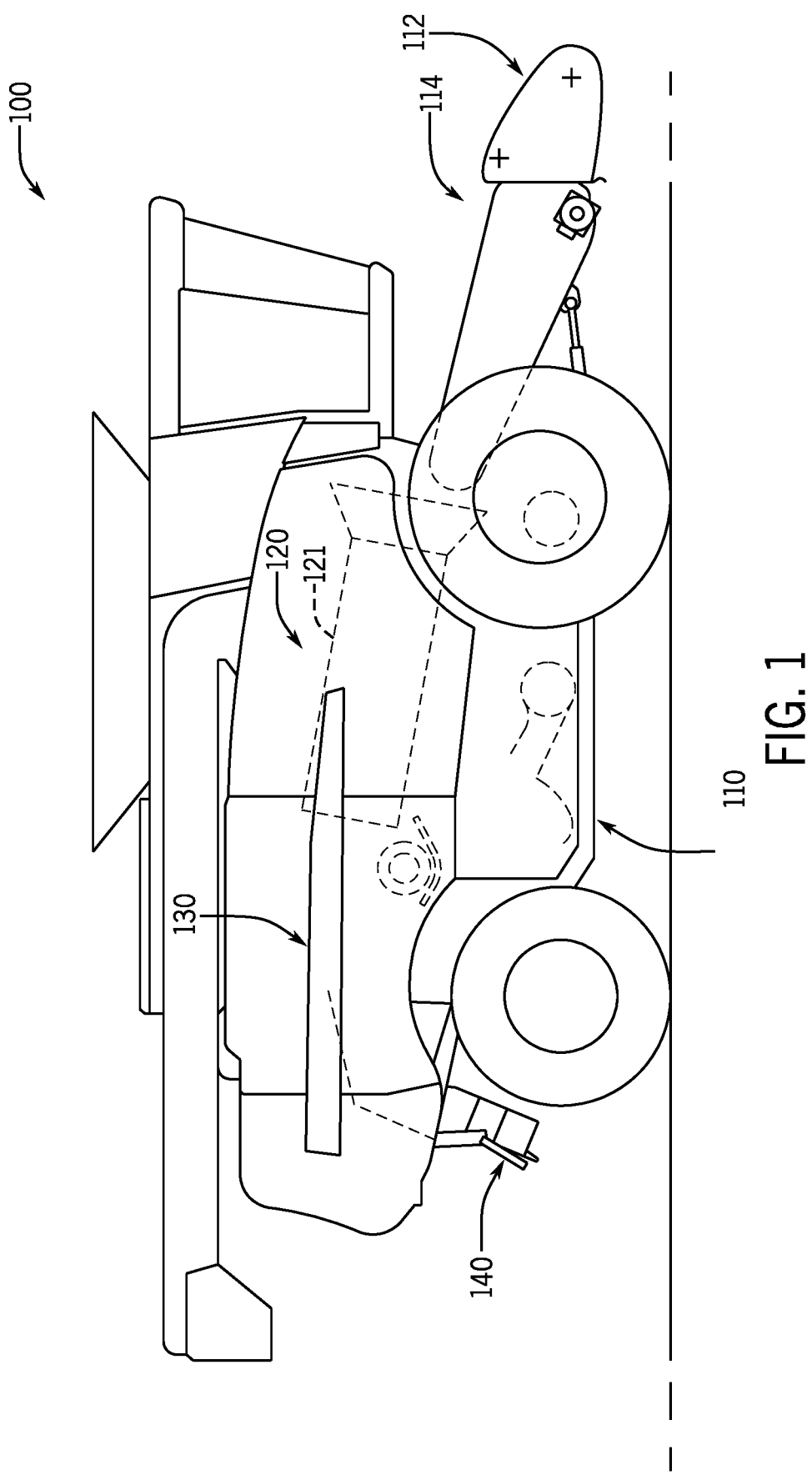
FIG. 1 is a side view of an embodiment of a harvester having a header, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut agricultural crops within a field via a header. The header may also gather the cut agricultural crops into a processing system of the harvester for further processing. The processing system may include a threshing machine configured to thresh the agricultural crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may be discarded from the harvester (e.g., via a spreader).

Before the techniques described herein, the header may have been supported by a harvester during operations. That is, the header may have been mechanically coupled to the harvester so that the weight of the header was supported by the harvester. The techniques described herein provide for a self-supporting header system. The self-supporting header system may thus be "pushed" through a field as opposed to being carried on a harvester.

The header may cut crops from the field that are encompassed within the width of the header. The header may include a cutter bar assembly that extends a portion of the width of the header, and the cutter bar assembly may use blades to cut the crops. The cut crops may fall onto the header, and the cut crops may be gathered together, such as via conveyors that run across the header. The gathered agricultural crops may then be transported into the processing system of the harvester.

The cutter bar assembly may be flexible, such as to conform to a contour of the ground while the cutter bar assembly is in contact with the ground. Certain harvesters include headers that include header segments configured to move independently from one another. For example, the cutter bar assembly may extend across the header segments. While the cutter bar assembly is operated such that the header segments are in contact with the field, the header segments may enable the cutter bar assembly to flex in response to contours of the field. The techniques described herein provide for actuators, such as hydraulic pistons, to be disposed on header segments and on wheel assemblies, which may result in a self-supporting harvester header system. For example, in certain embodiments, four actuators may be used, two actuators used to move two wheels and two actuators used to move header segments up on down relative to the ground and described in more detail below.

Thus, in accordance with certain embodiments of this disclosure, a self-supporting harvester header may be provided by using two or more wheels capable of moving up and down. The self-supporting harvester header may be supported via the two or more wheels and may be pushed as opposed to carried through a field during operations. Sensors may be used to provide for sensor inputs enabling actuation of the wheels and/or header segments to remain at a desired position with respect to ground when a distance to ground may be changing because of varying terrain.

The header segments may be adjusted to different positions independently of one another. Likewise, the wheel heights may be adjusted independently of the header segments and/or of each other. The header segments and wheels may be adjusted by a variety of methods. Although this disclosure primarily discuses use of a hydraulic system, the adjustment of the header segments and gauge wheels may be performed by other systems, such as an electromechanical system, a pneumatic system, any other suitable system, or any combination thereof. Further, as used herein, a harvester includes any variation of a harvester, including a combine harvester, that may use a header for harvesting.

Turning now to the drawings, FIG. 1 is a side view of a harvester 100 having a header. The harvester 100 includes a chassis 110 that supports harvesting apparatus to facilitate harvesting crops. As described in greater detail below, the header 112 (e.g., small grain header) that cuts crops and directs the cut crops toward an inlet of a crop processing system 120 of the harvester 100 for further processing of the cut crops. The crop processing system 120 receives cut crops from the header 112. As an example, the crop processing system 120 includes a thresher 121 that conveys a flow of crops through the crop processing system 120. In some embodiments, the thresher 121 includes a cylindrical threshing rotor that transports the crops in a helical flow path. In addition to transporting the crops, the thresher 121 may also separate certain desired crop material (e.g., grain) from residue (e.g., MOG), such as husk and pods, and direct the residue into a cleaning system located beneath the thresher 121. The residue may be transported to a crop residue handling system 130, which may hold the crop residue for further processing and/or expel the crop residue from the harvester 100 via a crop residue spreading system 140 positioned at the aft end of the harvester 100.

Figure 2:
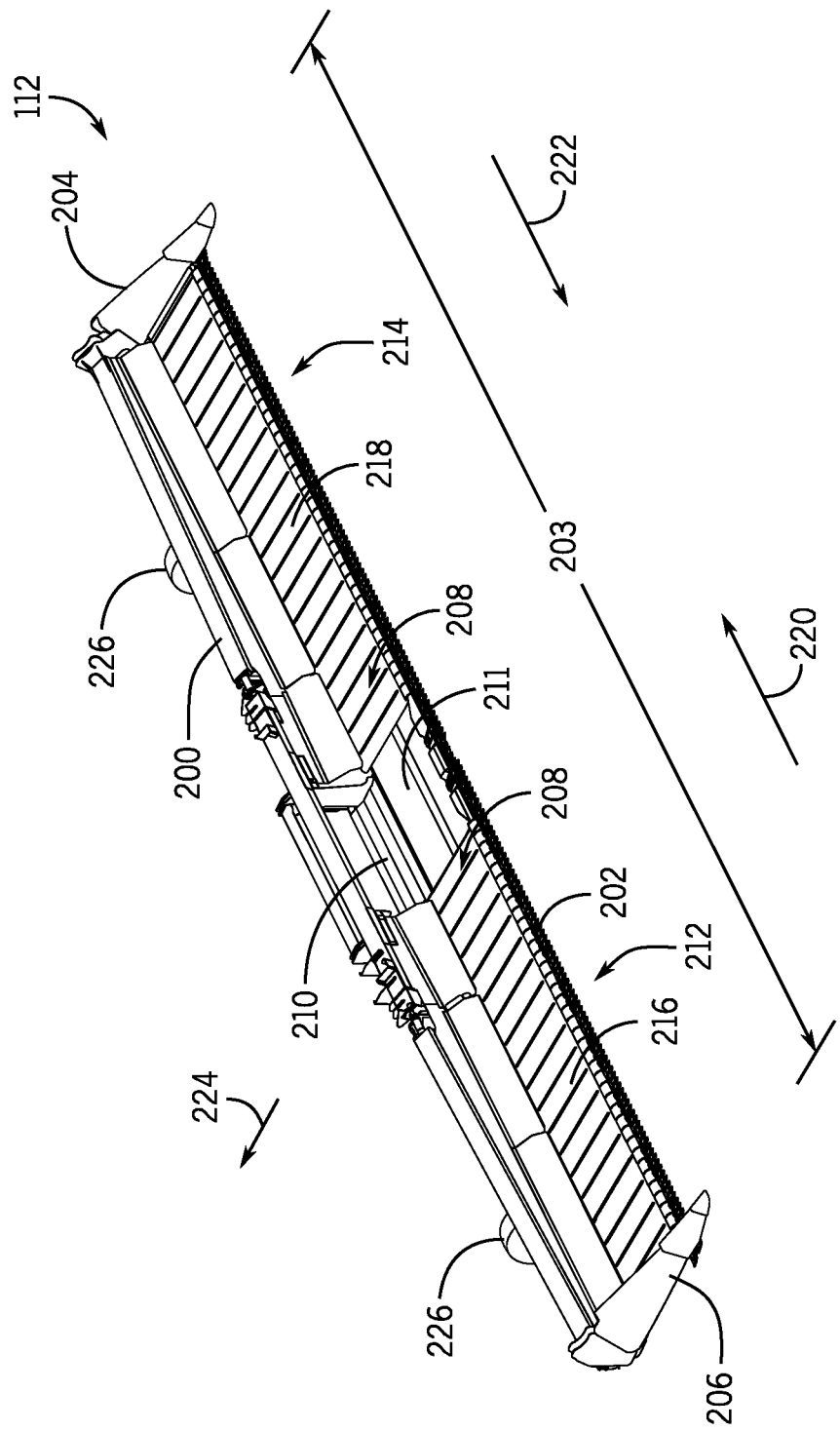
FIG. 2 is a perspective view of an embodiment of a header (e.g., small grain header) that may be used in conjunction with the harvester of FIG. 1, in accordance with an aspect of the present disclosure.

FIG. 2 is a perspective view of an embodiment of a header 112 that may be used by the harvester of FIG. 1. It should be noted that not all components of the header 112 are shown (e.g., reel, reel arms, infeed auger, etc.). The header 112 includes a frame 200 that may be removably coupled to a frame of the harvester 100. The header 112 also includes a cutter bar assembly 202 that extends across a width 203 of the frame 200 between side portions 204, 206 of the frame 200. When the harvester 100 is in operation, blades of the cutter bar assembly 202 engage and cut the crops. The portions of the crops that are cut may be directed onto a conveyor assembly 208 of the header 112 by a reel assembly. In general, the conveyor assembly 208 is configured to transport cut crops toward an inlet 210 and toward the crop processing system 120.

In the illustrated embodiment, the header 112 includes a center section 211, as well as a first header segment 212 and a second header segment 214 that are each pivotally coupled to opposite ends of the center section 211. The first header segment 212 and the second header segment 214 are independently adjustable. In other words, a position of the first header segment 212 is adjustable independent of a position of the second header segment 214. Likewise, a position of the second header segment 214 is adjustable independent of a position of the first header segment 212.

The cutter bar assembly 202 of the header 112 is flexible to enable the cutter bar assembly 202 to bend in response to adjustment of the first header segment 212 and/or adjustment of the second header segment 214. The cutter bar assembly 202 extends along the center section 211, the first header segment 212, and the second header segment 214. The first header segment 212 includes a first conveyor section 216 of the conveyor assembly 208, and the second header segment 214 includes a second conveyor section 218 of the conveyor assembly 208. The first conveyor section 216 extends a portion of the width 203 of the header 112, and the second conveyor section 218 extends another portion of the width 203 of the header 112. The first conveyor section 216 may direct the crops in a first direction 220 toward the center section 211 and the second conveyor section 218 may direct the crops in a second direction 222 towards the center section 211. The center section 211 may then direct the crops to the inlet 210 in a third direction 224 via another conveyor section of the conveyor assembly 208 toward the crop processing system 120. In certain embodiments, the third direction 224 may be transverse to the first direction 220 and the second direction 222.

The header 112 may include wheels (e.g., gauge wheels) 226 to facilitate movement of the header 112 when the harvester 100 is in operation. The wheels 226 may engage with the ground to control the header height via actuators. For example, the wheels 226 may be raised up or down via actuators to control a height of the cutter bar assembly 202 with respect to the ground as the self-supporting header 112 is "pushed" during operations. For example, the wheels 226 may enable the cutter bar assembly 202 to contact the ground, in which the position of the header segments 212, 214 may adjust to follow the contour of the ground. The wheels 226 may additionally or alternatively be retracted such that the header 112 is at a desired distance (i.e., a cutting height) above the ground. The position of the header segments 212, 214 and/or the wheels 226 may be independently controlled to match the contour of the cutter bar assembly 202 with the contour of the ground and maintain a substantially constant cutting height across the width 203 of the cutter bar assembly 202.

Figure 3:
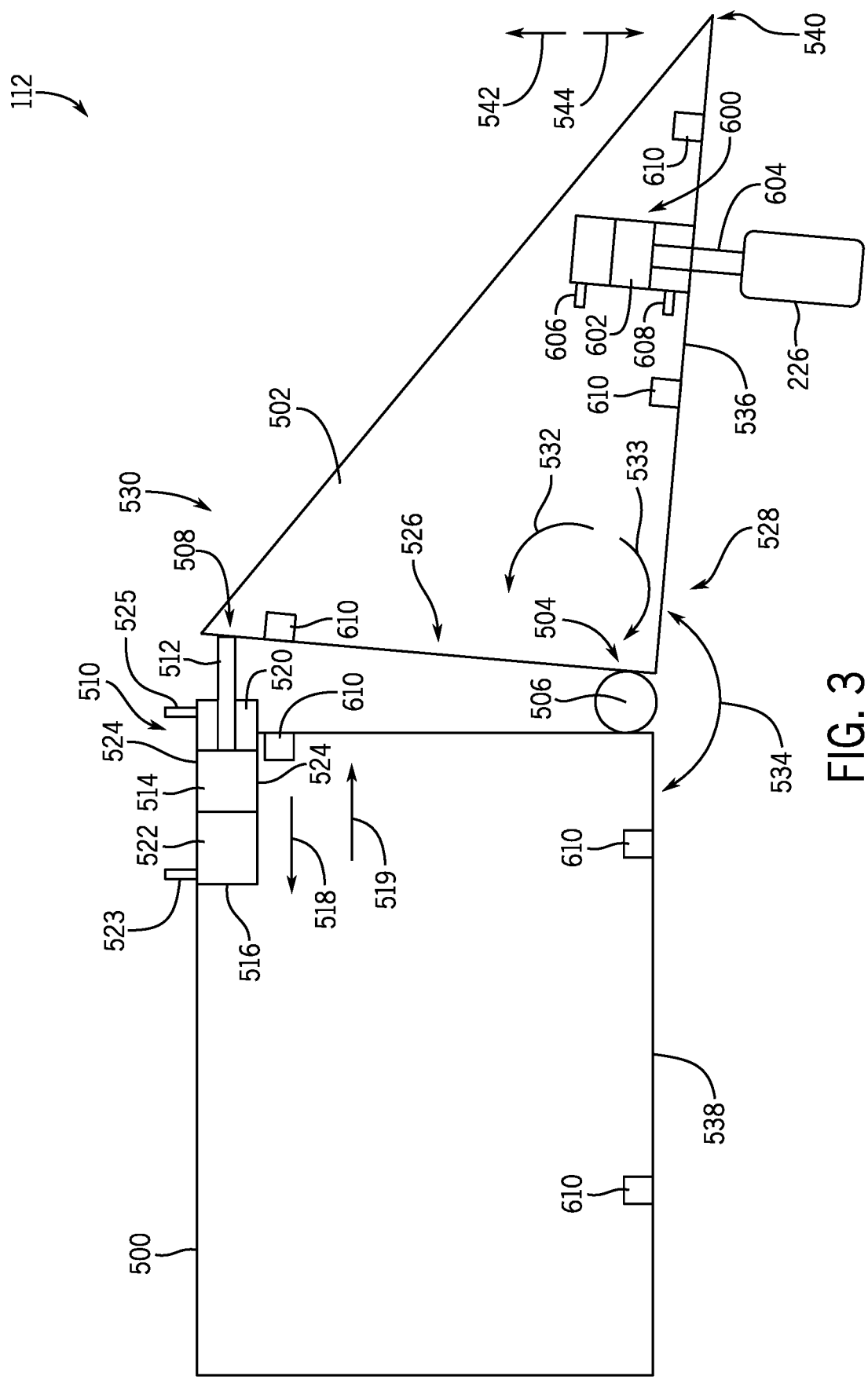
FIG. 3 is a schematic view of an embodiment of a position of a header (e.g., the header of FIG. 2) with a header segment in a lowered position, in accordance with an aspect of the present disclosure.

FIG. 3 is a schematic view of an embodiment of a portion of a header (e.g., the self-supporting header 112 of FIG. 2), in which a header segment is in a lowered position. As shown, the header 112 includes a center section 500 (e.g., section 211 shown in FIG. 2) and a header segment 502 (e.g., the first header segment 212 or the second header segment 214 of FIG. 2). The center section 500 is disposed to receive crops from the header segment 502 (e.g., from the conveyor assembly of the header segment 502) and to direct the crops to the inlet 210.

The position (e.g., orientation) of the header segment 502 is adjustable relative to the center section 500. The header segment 502 is rotatably coupled to the center section 500 at a first location 504 via a pivot 506. At a second location 508, the header segment 502 may be coupled to a double acting lift cylinder 510 configured to adjust a position (e.g., orientation) of the header segment 502. As illustrated, the header segment 502 is coupled to a rod 512 of the double acting lift cylinder 510. The rod 512 is coupled to a piston 514 disposed within a body 516 of the double acting lift cylinder 510.

The piston 514 is configured to move both in a first piston direction 518 and a second piston direction 519 within the body 516, such as via a pressure differential between a first section 520 (i.e., the side of the piston 514 where the rod 512 is coupled to the piston 514) of the body 516 and a second section 522 (i.e., the side of the piston 514 without the rod 512) of the body 516. For example, a first inlet/outlet 523 (e.g., cap end inlet/outlet) may be used to transmit pressurized hydraulic fluid to move the piston 514 in the direction 519 with hydraulic fluid exiting via an inlet/outlet 525 (e.g., rod end inlet/outlet). To move in the direction 518, the pressurized hydraulic fluid may be provided to the inlet/outlet 525, pushing the piston 514 in the direction 518. The hydraulic fluid may then exit the inlet/outlet 523.

Accordingly, a difference between a pressure in the first section 520 and a pressure in the second section 522 may drive the piston 514 to move the rod 508, thereby adjusting the header segment 502. To block fluid flow around the piston, seals 524 are disposed around the piston 514. The seals 524 maintain a desired pressure differential between the first section 520 and the second section 522. As such, fluid pressure may be applied to either the first section 520 and/or the second section 522 of the piston 514 to create a desired pressure differential to drive the double acting piston 514 into a desired position within the body 516.

As illustrated, the first location 504 and the second location 508 are each disposed on an inner side 526 of the header segment 502. However, the first location 504 is disposed at a first end 528 of the inner side 526, opposite a second end 530 of the inner side 526 where the second location 508 is disposed. As a result, when the piston 514 moves within the body 516, the rod 512 drives the second end 530 to move generally in the first piston direction 518 or the second piston direction 519. However, since the first end 528 is rotatably coupled to the pivot 506, the header segment 502 rotates in a first rotational direction 532 or a second rotational direction 533 about the pivot 506 in response to movement of the second end 530. In this manner, as the piston 514 is moved within the body 516, an angle 534 between a bottom side 536 of the header segment 502 and a bottom side 538 of the center section 500 is adjusted. Further, a position of an outer end 540 of the header segment (e.g., a third end) is adjusted, such as in a first vertical direction 542 and a second vertical direction 544. As described in this disclosure, when the piston 514 is moved in the first piston direction 518, the header segment 502 rotates in the first rotational direction 532 and the outer end 540 is moved in the first vertical direction 542 (i.e., the angle 534 increases) to raise the header segment 502. Furthermore, when the piston 514 is moved in the second piston direction 519, the header segment 502 rotates in the second rotational direction 533 and the outer end 540 is moved in the second vertical direction 544 (i.e., the angle 534 is decreases) to lower the header segment 502. Since the outer end 540 is lower than the bottom side 538 of the center section 500, as shown in FIG. 3, the header segment 502 is considered to be in a lowered position.

Also shown in the block diagram view is a second double acting lift cylinder 600 mechanically coupled to the wheel 226. The second double acting lift cylinder 600 may include a piston 602 and rod 604 which may be used to lower or raise the wheel 226 in the directions 542, 544 with respect to ground. For example, the double acting lift cylinder 600 may receive pressurized hydraulic fluid via inlet/outlet 606 (e.g., rod end inlet/outlet) to move the piston 602 and rod 604 in the direction 544, thus raising the header segment 502 with respect to ground. The hydraulic fluid may exit through inlet/outlet 608 (e.g., cap end inlet/outlet) as the piston 602 moves in the direction 544.

To lower the header segment 502 with respect to ground, pressurized hydraulic fluid may be provided via the inlet/outlet 608, thus moving the piston 602 and rod 604 in the direction 542. The hydraulic fluid may then exit through the inlet/outlet 606 (e.g., cap end). Accordingly, the wheel 226 may be lowered. It is to be understood that the wheel 226 may be connected to the rod 604 through a wheel fork system, suspension system, and so on. It is also to be noted that the double acting lift cylinders 510 and 600 may be actuated independent of each other, thus providing for improved ground counter following abilities for the header system 12. It is also to be understood that two single acting cylinders may be used in lieu of the double acting cylinders, e.g., cylinders 510, 600 with rods disposed at opposite sides. It is also to be understood that the header segment 502 may be raised and/or lowered through a combination of actuation of the cylinder 600 and actuation of the cylinder 510.

Also shown are multiple sensors 610 disposed in the header section 502 and/or the center section 500. The sensors 610 may be communicatively coupled to a control system, as further described below, and used to improve the control of movement of the center section 500 and/or the header section 502 via the cylinders 510 and/or 600. The sensors 610 may include distance sensors suitable for measuring a distance to ground, such as laser sensors, lidar, radar sensors, mechanical sensors, and so on. The sensors 610 may also include gyroscopic sensors suitable for deriving the angle 534. It is to be understood that the sensors 610 may be disposed in a variety of locations, such as at or near the end 540, along the bottom side 536, near the pivot 506, along the bottom side 538, and so on.

Figure 4:
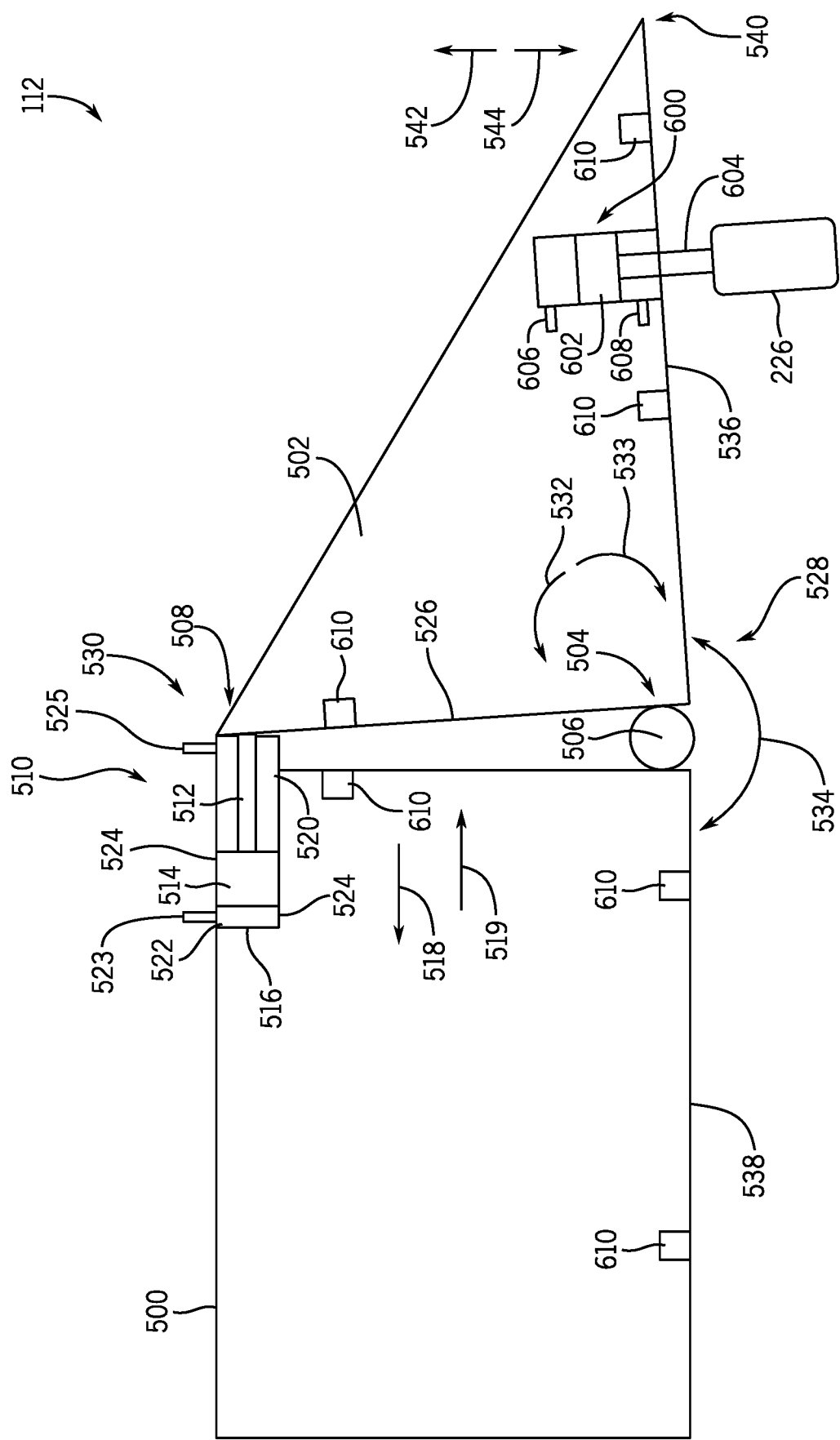
FIG. 4 is a schematic view of the position of the header of FIG. 3 with the header segment in a raised position, in accordance with an aspect of the present disclosure.

FIG. 4 is a schematic view of the portion of the header of FIG. 3 with the header segment 502 in a raised position. As illustrated, the outer end 540 of the header segment 502 is raised above the bottom side 538. Additionally, as illustrated in FIG. 4, the piston 514 is moved in the first piston direction 518 to retract the rod 512. As a result, the second location 508 is moved in the first piston direction 518 and the header segment 502 is rotated in the first rotational direction 532 to raise the outer end 540 in the first vertical direction 542.

As mentioned above, incompressible fluid (e.g., hydraulic fluid) may be used to move the piston 514. A certain amount of the fluid may be disposed in the first section 520 and in the second section 522 of the double acting lift cylinder 510, and each section 520, 522 may be connected to a fluid delivery system via inlet/outlets 523, 525. As mentioned earlier, the first inlet/outlet 523 may be used to transmit hydraulic fluid to move the piston 514 in the direction 519 with hydraulic fluid exiting via the inlet/outlet 525. To move in the direction 518, the pressurized hydraulic fluid may be provided to the inlet/outlet 525, pushing the piston 514 in the direction 518. The hydraulic fluid may then exit the inlet/outlet 523.

To move the piston 514 in the first piston direction 518, the pressure in the first section 520 may be increased via the inlet/outlet 525, and the increased pressure exerts a force against the piston 514 to move the piston 514 in the first piston direction 518. As the piston 514 moves in the first piston direction 518, fluid from the second section 522 may exit via inlet/outlet 523. Additionally or alternatively, fluid may be added to the second section 522 via inlet/outlet 523 to increase the forces caused by the fluid pressure in the second section 522. As pressurized fluid is delivered via inlet/outlet 523, the piston may move in the second piston direction 519 opposite the first piston direction 518 and as a result, fluid in the second section 522 may flow out of inlet/outlet 525.

As mentioned above, to raise or to lower the header segment 502 with respect to ground, pressurized hydraulic fluid may be provided via the inlet/outlets 606, 608, thus moving the piston 602 and rod 604 in the directions 542, 544. For example, pressurized fluid may be transmitted via inlet/outlet 608 to raise the wheel 226 in the direction 542. The hydraulic fluid may then exit through the inlet/outlet 606. Likewise, pressurized fluid may be transmitted via inlet/outlet 606 to lower the wheel 226 in the direction 544. The hydraulic fluid may then exit through the inlet/outlet 608. Accordingly, the wheel 226 may be raised and/or lowered. It is to be understood that the wheel 226 may be connected to the rod 604 through a wheel fork system, suspension system, and so on. It is also to be noted that all of the double acting lift cylinders 510 and 600 may be actuated independent of each other, thus providing for improved ground-following abilities for the header system 12.

The header 112 depicted in FIGS. 3 and 4 may include other suitable arrangements. For example, although FIGS. 3 and 4 depict a single header segment 502 is coupled to the center section 500 in the illustrated embodiments, additional or alternative embodiments of the header may include any suitable number of header segments coupled to the center section. Moreover, a header segment may be coupled to the center section in a different manner, such as at a different part of the center section. One header segment may also be coupled to another header segment 502, rather than the center section 500, and each header segment 502 may be controlled independently. Furthermore, the shape of each component may be different than that illustrated in FIGS. 3 and 4. By way of example, a header segment may be rectangular and/or each header segment may have a different shape. In further embodiments, raising and lowering the header segment may be driven by moving one or more cylinders in the opposite directions as shown in FIGS. 3 and 4. For example, moving the piston in the first piston direction 518 may lower the header segment while moving the piston in the second piston direction 519 may raise the header segment. In such embodiments, the location of the lift cylinder and the pivot may be switched (e.g., the double acting lift cylinder 510 may be disposed at the first end 528, and the pivot 506 may be disposed at the second end 530). Moreover, although the lift cylinder is disposed on the center section with the rod coupled to the second location of the header segment, the lift cylinder may alternatively be disposed on the header segment with the rod coupled to the center section. Further still, certain embodiments may include additional lift cylinders to adjust the position of the header segment. For instance, another lift cylinder may be used instead of the pivot. Accordingly, multiple lift cylinders may be adjusted to raise and lower the header segment.

Figure 5:
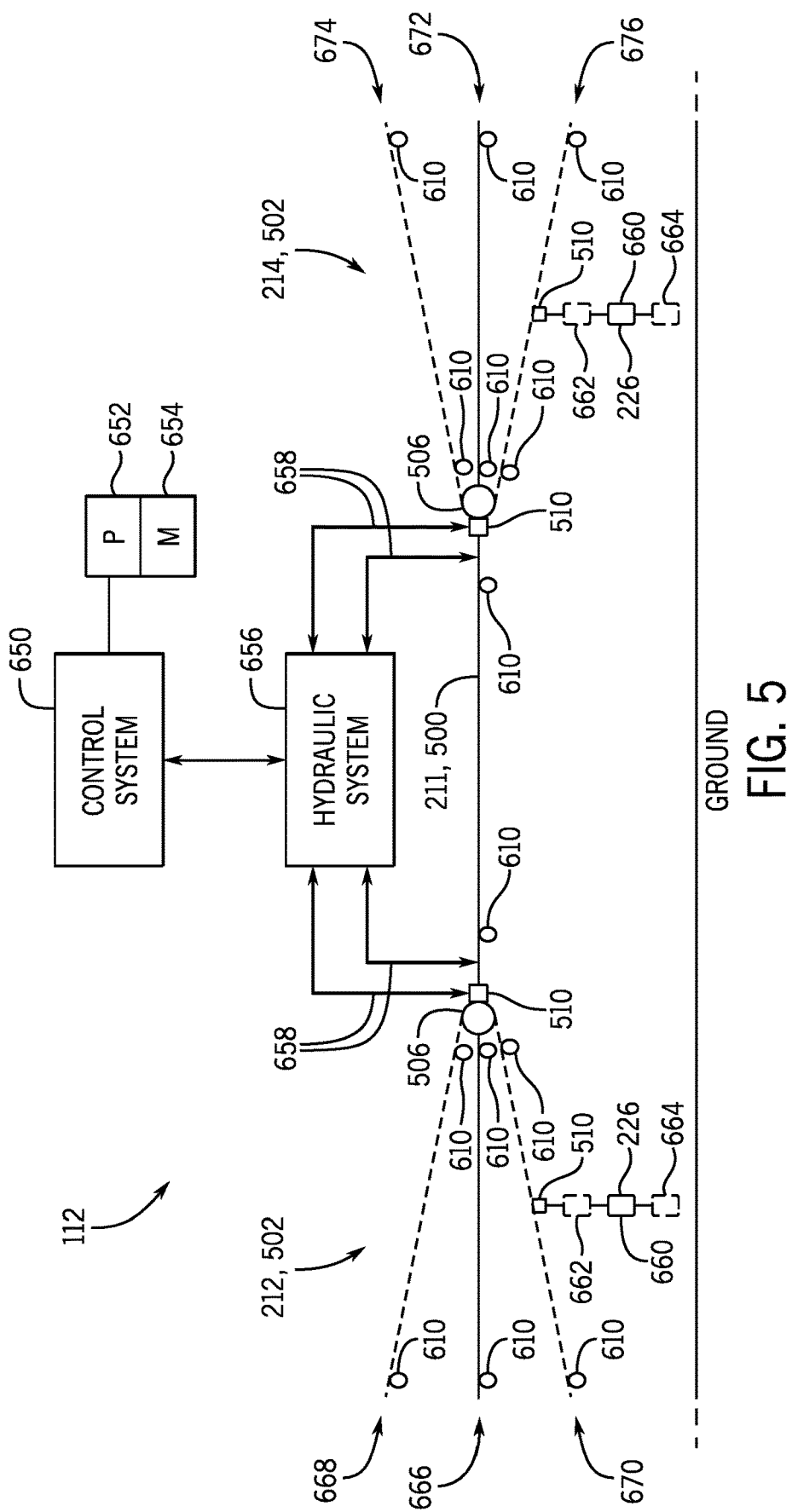
FIG. 5 is a schematic diagram of an embodiment of a hydraulic system that may be employed within the header of FIGS. 3-4, in which the hydraulic system is configured to adjust a position of wheels and/or header segments, in accordance with an aspect of the present disclosure.

FIG. 5 is a block diagram of an embodiment of a control system 650 that may be operatively coupled to the self-supporting header 112 and used to control the header 112 during operations. The control system 650 may include one or more processor(s) 652 and a memory 654. The processor (s) 652 may executed computer code or instructions stored in the memory 640, such as code or instructions to control the header 112 during operations of the header 112. In the depicted embodiment, the control system 650 may be communicatively coupled to the one or more sensors 610. As mentioned earlier, the sensors 610 may measure distances to ground as well as distances to other components (e.g., distance between center section 500 and sections 502), angle of rotation of the sections 502 with respect to the center section 500, and so on. The sensors 610 may be communicatively coupled to the control system 650 via wireless techniques (e.g., mesh networking techniques such as Zigbee, Z wave, WeMo, and non-mesh networking techniques such as Wi-Fi, IEEE 802.11X, etc.), and/or wired conduits.

The control system 650 is also operatively coupled to a hydraulic system 656. The hydraulic system 656 may in turn be operatively coupled to the cylinders 510, 600 via fluid conduits 658. For example, the control system 650 may use the hydraulic system 650 to provide for the flow of pressurized hydraulic fluid into or out of the inlet/outlets 523, 525 of the double acting cylinders 510, and/or into or out of the inlet/outlets 606, 608 of the double acting cylinders 600. Accordingly, the sections 502 (e.g. corresponding to the segments 212, 214 of FIG. 2) may be raised or lowered independent of each other and of the center section 500 (e.g., corresponding to segment 211 of FIG. 2).

For example, the figure FIG. 5 illustrates section 500 corresponding to section 211 of FIG. 2 with wheels 226 disposed in a center position 660, a top position 662, and a bottom position 664. Similarly, section 502 corresponding to section 212 of FIG. 2 is depicted as disposed in a center position 666, a top position 668, and a bottom position 670. Likewise, section 502 corresponding to section 214 of FIG. 2 is depicted as disposed in a center position 672, a top position 674, and a bottom position 676. In use, the control system 650 may raise or lower the sections 211, 212 and/or 214 based on the characteristics of the field being worked on.

For example, the sections 211, 212 and/or 214 may be lowered or raised to more closely follow ground contours. That is, some of the sensors 610 may be monitored to derive information such as the angle 534, a distance to the ground under the sensors 610, position of the sections 502 relative to the section 500, speed, and so on. The derived information then be used to adjust the sections 211, 212 and/or 214. In certain embodiments, the sensors 610 may include "look-ahead" sensors such as lidar, lasers, radar, and so on, which may provide information on upcoming terrain (e.g., terrain in front of the self-supporting header 112). The control system 650 may then respond in real-time to the upcoming terrain to maintain desired angles 534 and/or distances between ground and the sections 211, 212 and/or 214. For example, wheels 226 may be raised or lowered to keep the center section 211, 212, and/or 214 at substantially the same distance relative to the ground. Indeed, the sections 211, 212 and/or 214 may be raised or lowered to account for changes in terrain. It is also to be noted that a human operator interfacing with the control system 650 may also set positions of the sections 211, 212 and/or 214 and the wheels 226, e.g., set a target position. For example, certain crops may be harvested at different cutting heights, and the operator may adjust the height accordingly.

Figure 6:
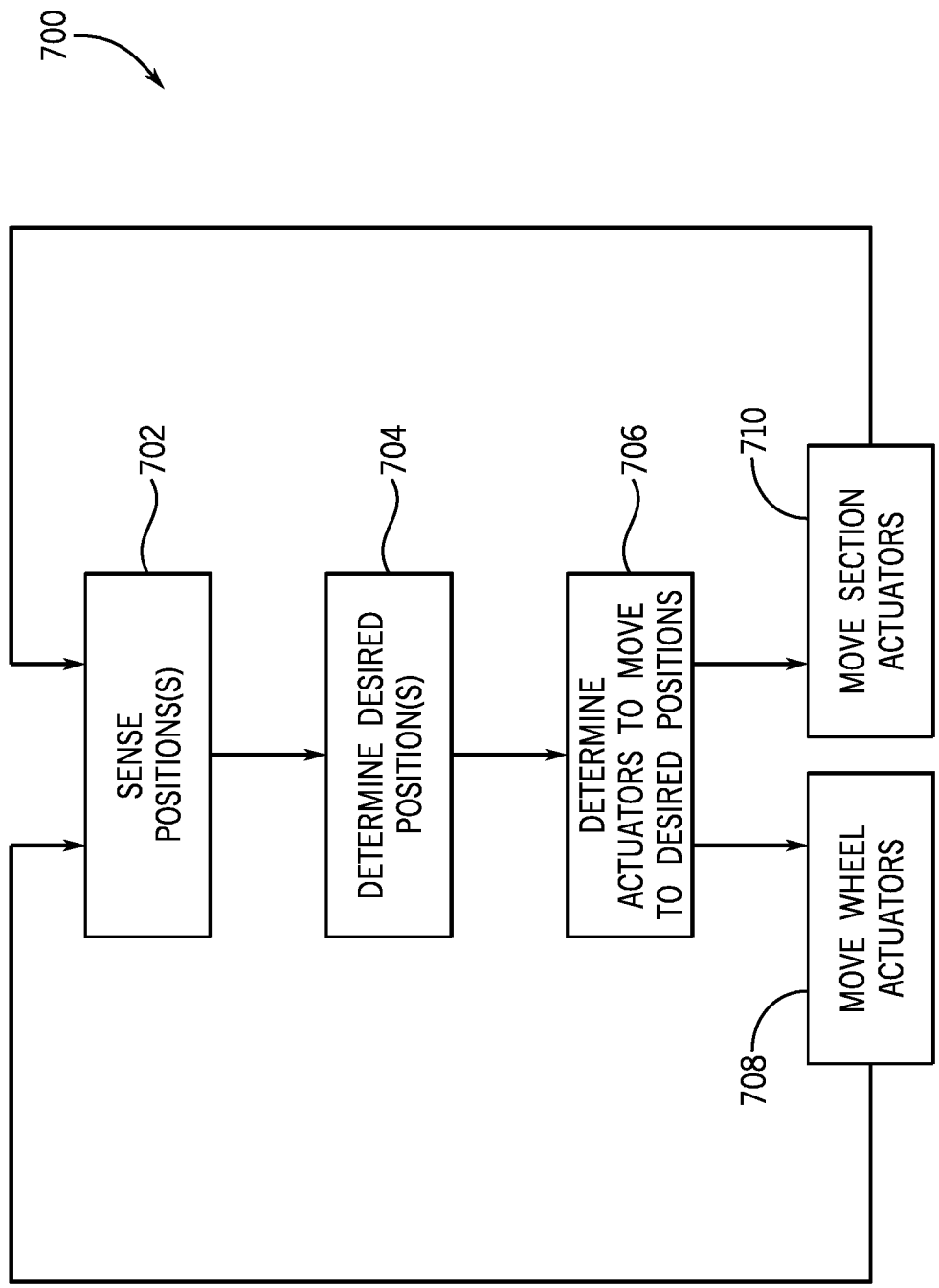
FIG. 6 is a flowchart of an embodiment of a process to adjust a position of wheels and/or header segments, in accordance with an aspect of the present disclosure.

Turning now to FIG. 6, the figure is a flow chart of an embodiment of a process 700 suitable for controlling operations of the self-supporting header 112, such as updating positions of the sections 211, 212 and/or 214. The process 700 may be implemented as code or instructions executable via the processor(s) 652 and stored in the memory 654. In the depicted embodiment, the process 700 may sense (block 702) positions for certain components of the self-supporting header 112 and/or the ground. For example, angles 534 may be derived, distances of the sensors 610 to ground may be derived, distances of the sections 211, 212 and/or 214 with respect to ground or each other (e.g., distances as the sections angle away from each other) may be derived.

The process 700 may then determine (block 704) a desired position for the wheels 226, and/or the sections 211, 212, 214. For example, upcoming terrain sensed via the sensors 610 may benefit from raising or lowering the wheels 226, and/or from extending or retracting cylinders 510 to change the angle 534 between segments 502 and the center section 500. That is, to more closely follow the contours of the terrain, the process 700 may adjust any one or more of the cylinders 510, 600, to alter angles between the sections 211, 212, 214 and to raise or lower (e.g., via raising or lowering the wheels 226) the self-supporting header 112 with respect to ground. Accordingly, desired positions for the wheels 226, and/or the sections 211, 212, 214 may be determined (block 704).

When the desired positions for the wheels 226, and/or the sections 211, 212, 214 are determined, the process 700 may then determine (block 706) which actuators to move and what types and/or amounts of movement to control to arrive at the desired positions for the wheels 226, and/or the sections 211, 212, 214. For example, the process 700 may determine details of how much hydraulic fluid to transmit via pumps, with valves to actuate to transmit the hydraulic fluid via certain conduits 658, and so on. Accordingly, in certain embodiments, the hydraulic system 656 may include pumps, valves, hydraulic repositories, and so on, used to actuate the cylinders 510, 600.

The process 700 may then move (block 708) the wheel actuator(s) (e.g., the cylinders 600), if desired, to adjust the wheels 226. Likewise, the process 700 may move (block 710) the segment 502 actuators (e.g., the cylinders 510) to adjust the sections 212, 214 with respect to the center section 211. The process 700 may be an iterative process, continuously sensing and adjusting positions for the wheels 226, and/or the sections 211, 212, 214. Accordingly, the process 700 may iterate back to the sensing block 702 and continue operations as described.

Additional steps not already described in FIG. 6 may be performed, such as intermediate steps between certain blocks, steps performed before block 702, and/or steps performed after block 710. Further, certain steps may be performed in a different order than described in FIG. 6. Further still, certain steps of the process 700 may be performed simultaneously rather than sequentially. Modifications of certain steps of the process 700 may also be made, so long as the modified steps are still able to appropriately adjust the position of the header segment.

Figure 7:
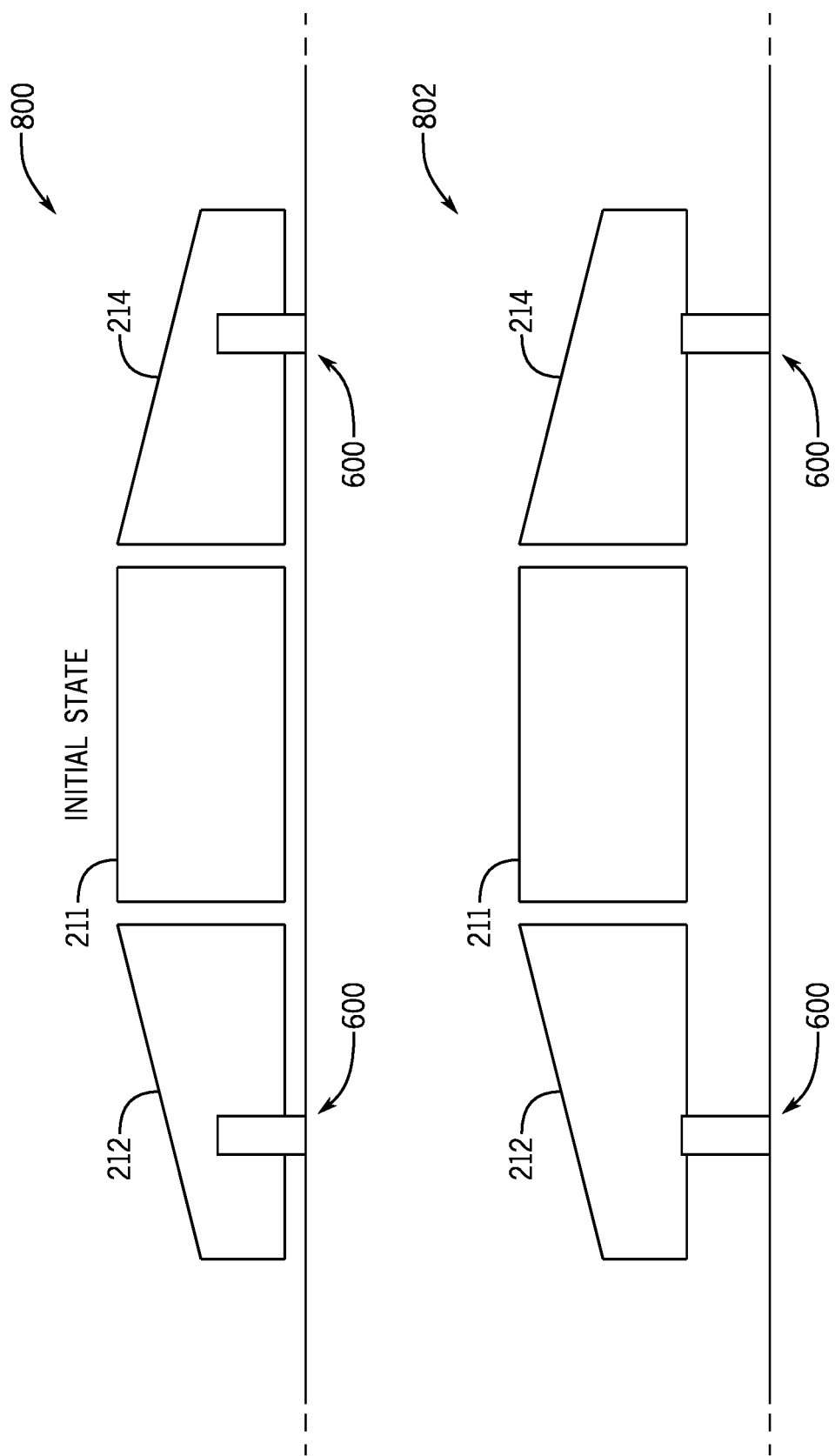
FIG. 7 is a block diagram of a frontal view of an embodiment of the header 112 show in a first state and in a second state.

Turning now to FIG. 7, the figure is a block diagram of a frontal view of the header 112 showing a first initial state 800. The initial state 800 may refer to a state where the terrain may be uniformly level. To change height, for example to raise the segments 211, 212, and 214, the cylinders 600 may be actuated as shown in raised state 802. In raised state 802 the cylinders 600 may be actuated to extend but the wing actuators (e.g., cylinders 510) may be left unchanged. Accordingly, the entire header 112 may be raised with respect to ground.

Figure 8:
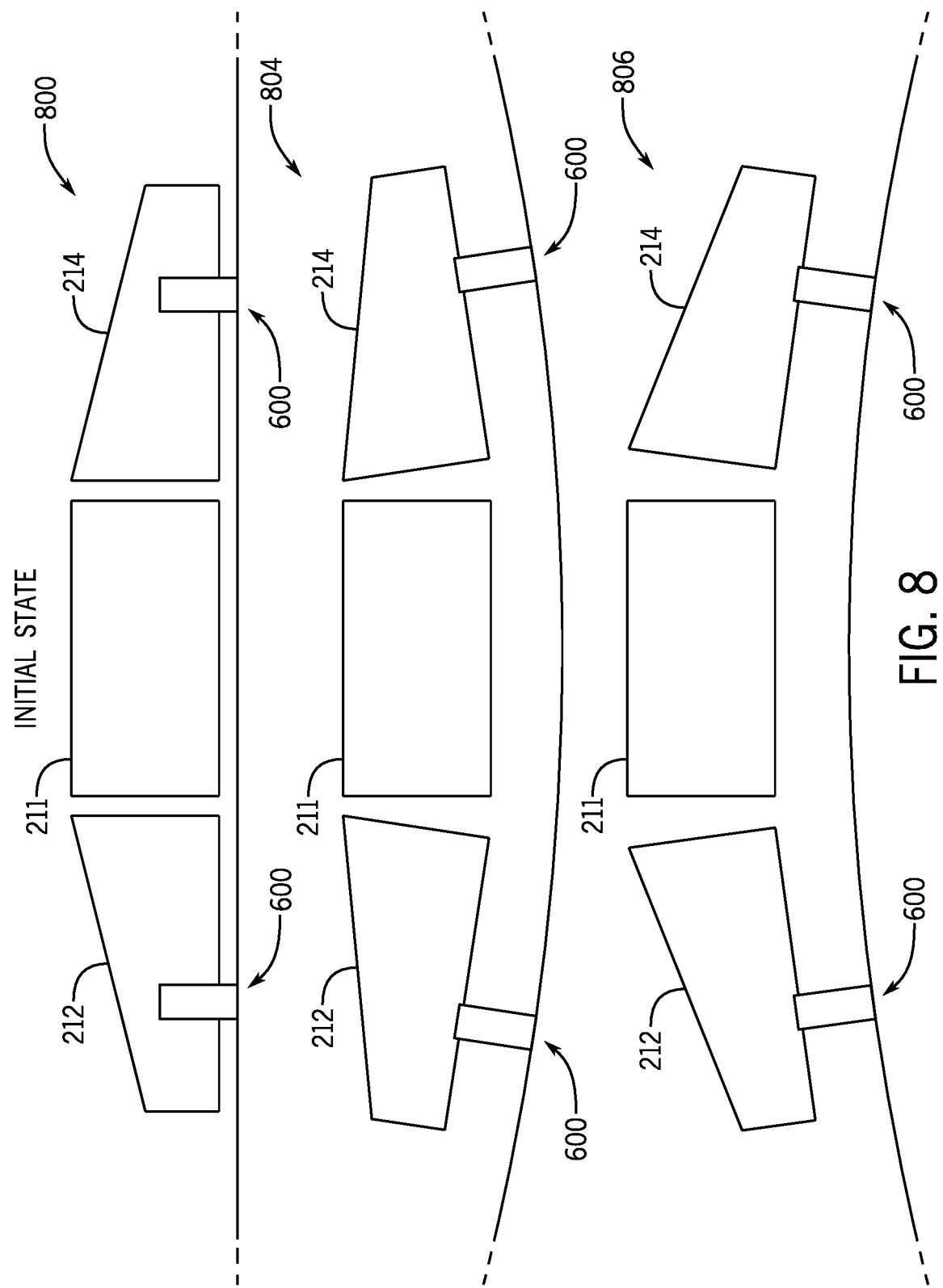
FIG. 8 is a block diagram of a frontal view of an embodiment of the header 112 show in the first state and in a third state, and in a fourth state.

FIG. 8 figure is a block diagram of a frontal view of the header 112 showing the first initial state 800 and then transitions into states 804 and 806. In state 804, the cylinders 600 are extended and the wing actuators (e.g., cylinders 510) are retracted. Accordingly, the header 112 may more easily operate in a "bowl" shape or similarly shaped section of ground. In state 806, the cylinders 600 are extended and the wing actuators (e.g., cylinders 510) are also extended. Accordingly, the header 112 may more easily operate in a "mound" shape or similarly shaped section of ground.

Figure 9:
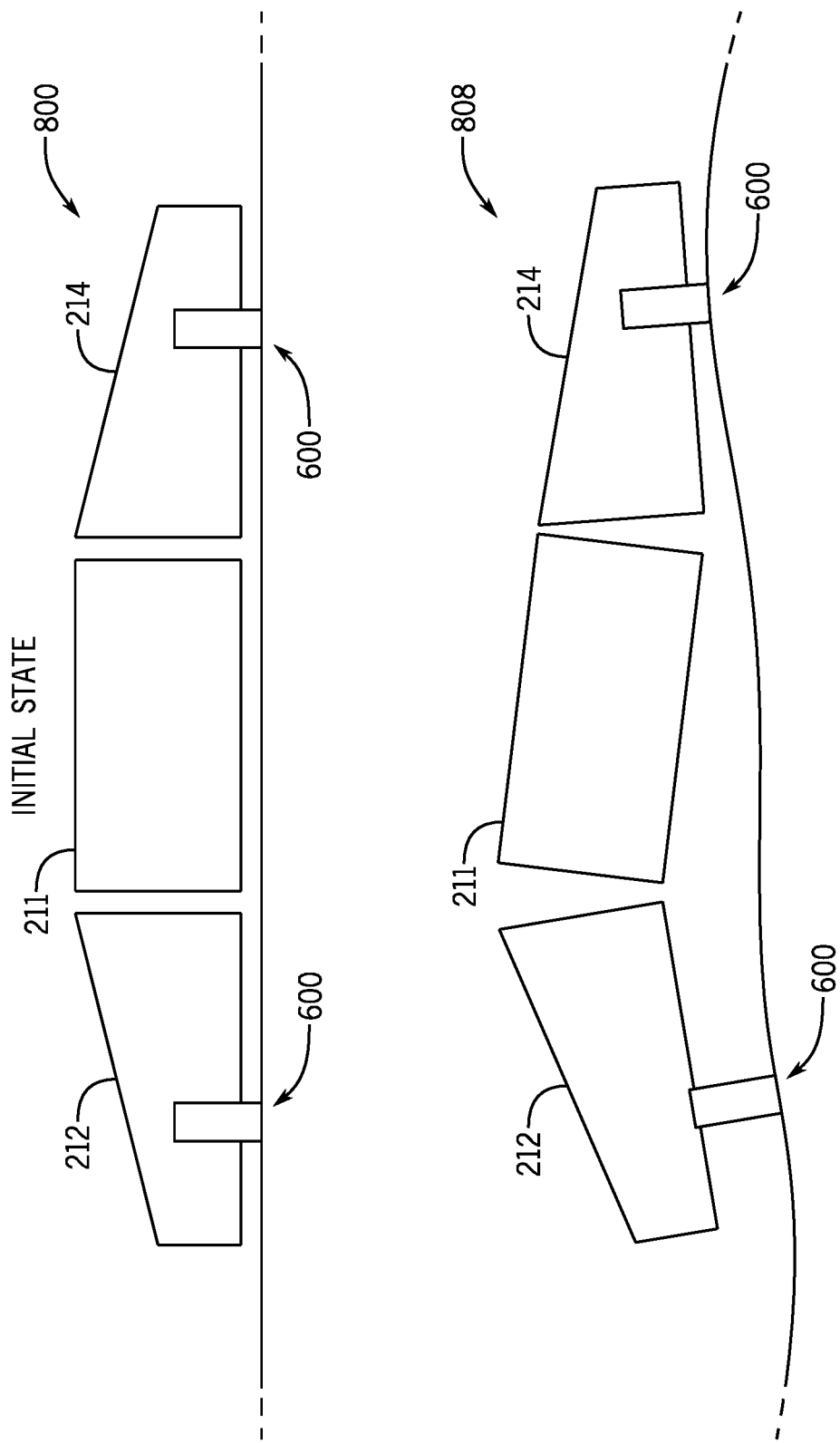
FIG. 9 is a block diagram of a frontal view of an embodiment of the header 112 show in the first state and in a fifth state.

Various ground contours may be followed via the techniques described herein. For example, FIG. 9 is a diagram of a frontal view of the header 112 showing first in the initial state 800 and then operating in a state 808 over uneven ground. In state 808, the cylinder 600 disposed in the section 212 is shown as extended, while the cylinder 600 disposed in the section 214 is shown as retracted. On section 212, the wing actuator (e.g., cylinder 510) is shown as extended while the wing actuator (e.g., cylinder 512) on section 214 is shown as retracted. Accordingly, the header 112 may more easily navigate the uneven ground. Indeed, by controlling one or more of the four actuators, e.g., two cylinders 510 and two cylinders 600, the techniques described herein may enable more efficient cutting over a variety of ground contours.

While only certain features of the disclosure have been illustrated and described herein, many modifications and changes will occur to those skilled in the art. It is, therefore, to be understood that the appended claims are intended to cover all such modifications and changes as fall within the essence of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A header of a harvester, comprising:
a first header segment comprising a cutter bar configured to cut crops, and a first portion of a conveyor assembly;
a center section comprising a second portion of the conveyor assembly, wherein the center section is configured to receive cut crops from the header segment via the first portion of the conveyor assembly, and the second portion of the conveyor assembly is configured to transport the received cut crops to a crop processing system of the harvester;
a first ground engaging element configured to at least partially support a weight of the header;
a first sensor configured to output a signal indicative of a distance to ground;
a first actuator coupling the first ground engaging element to the header; and
a control system comprising a processor configured to receive a sensor signal from the first sensor and to control the first actuator to adjust the first ground engaging element based on the sensor signal.

2. The header of claim 1, further comprising a second ground engaging element configured to at least partially support the weight of the header and a second actuator coupling the second ground engaging element to the header, wherein the processor is configured to control the first actuator to adjust the first ground engaging element based on the sensor signal and the second actuator to adjust the second ground engaging element based on the sensor signal.

3. The header of claim 2, further comprising a second sensor configured to output a second signal representative of an extension of the first ground engaging element or of the second ground engaging element with respect to the header, wherein the processor is configured to control the first actuator to adjust the first ground engaging element and the second actuator to adjust the second ground engaging element based on the sensor signal and on the second sensor signal.

4. The header of claim 1, wherein the actuator comprises a double acting hydraulic cylinder coupled to a hydraulic system, and wherein the processor is configured to control the hydraulic system to actuate the double acting hydraulic cylinder.

5. The header of claim 1, wherein the control system is configured to receive a target position for the header with respect to ground from a user interface, and wherein the processor is configured to control the first actuator to adjust the first ground engaging element based on the sensor signal and on the target position.

6. The header of claim 1, further comprising a second actuator coupling the first header segment to the center section, wherein the processor is configured to control the second actuator based on the sensor signal, based on a second sensor signal, or a combination thereof, and wherein the second sensor signal is transmitted from a second sensor.

7. The header of claim 6, further comprising an additional header segment and a third actuator coupling the additional header segment to the center section, wherein the controller is configured to control the additional actuator based on the sensor signal.

8. The header of claim 2, wherein the first and the second ground engaging elements are wheels which completely support the weight of the header when the header is in use.

9. The header of claim 8, wherein the harvester is configured to abut against and push the header during harvesting operations.

10. A header of a harvester, comprising:
a header segment comprising a cutter bar configured to cut crops;
a center section configured to receive the cut crops from the header segment via a conveyor assembly;
a pivot rotatably coupling the center section to the header segment;
a first ground engaging element assembly comprising a first ground engaging element configured to at least partially support a weight of the header;
a first sensor configured to output a signal indicative of a distance to ground;
a hydraulic system comprising one or more fluid conduits fluidly coupled to a header segment cylinder included in the header segment and to a first ground engaging element cylinder included in the first ground engaging element assembly, wherein the hydraulic system is configured to control a first extension of the first ground engaging element cylinder and a second extension of the header segment cylinder; and
a control system comprising a processor operatively coupled to the hydraulic system, wherein the processor is configured to receive the signal indicative of the distance to ground and to adjust the first extension, the second extension, or a combination thereof, based on the signal.

11. The header of claim 10, further comprising a second ground engaging element assembly comprising a second ground engaging element configured to at least partially support the weight of the header, wherein the one or more fluid conduits are fluidly coupled to a second ground engaging element cylinder included in the second ground engaging element assembly, wherein the hydraulic system is configured to control a third extension of the second ground engaging element cylinder, and wherein the processor is configured to adjust the third extension based on the signal.

12. The header of claim 11, further comprising a second sensor configured to output a second signal representative of the first extension of the first ground engaging element cylinder or of the third extension of the second ground engaging element cylinder, wherein the processor is configured to adjust the first extension, the second extension, the third extension, or a combination thereof, based on the signal, the second signal, or the combination thereof.

13. The header of claim 10, wherein the header segment cylinder, the first ground engaging element cylinder, or a combination thereof, comprises a double acting cylinder.

14. The header of claim 13, wherein the double acting cylinder comprises a rod side inlet/outlet port, a cap side inlet/outlet port, and a piston-rod assembly, wherein the a first of the one or more fluid conduits is fluidly coupled to the rod side inlet/outlet port and a second of the one or more fluid conduits is fluidly coupled to the cap side inlet/outlet port, and wherein the hydraulic cylinder is configured to provide pressurized hydraulic fluid through the rod side inlet/outlet port to move the piston-rod assembly towards a cap end and through the cap side inlet/outlet port to move the piston-rod assembly towards a rod end to adjust the first extension, the second extension, or the combination thereof.

15. The header of claim 11, wherein the first and the second ground engaging element elements are wheels which completely support the weight of the header when the header is in use.

16. A method, comprising:
receiving, from a sensor disposed in a header of a harvester, a sensor signal;
deriving, via processor included in a control system, a distance to ground based on the sensor signal; and
adjusting, via the processor, a first extension of a first ground engaging element included in the header based on the distance to ground, wherein the header comprises a first header segment comprising a cutter bar configured to cut crops, and a first portion of a conveyor assembly; and a center section comprising a second portion of the conveyor assembly, wherein the center section is configured to receive cut crops from the header segment via the first portion of the conveyor assembly, and the second portion of the conveyor assembly is configured to transport the received cut crops to a crop processing system of the harvester.

17. The method of claim 16, further comprising adjusting, via the processor, a second extension of the first ground engaging element based on the distance to ground.

18. The method of claim 17, further comprising receiving, from a second sensor, a second signal representative of a distance between the first header segment and the center section, and adjusting, via the processor, a third extension of the first ground engaging element based on the distance between the first header segment and the distance to ground.

19. The method of claim 18, further comprising adjusting, via the processor, a fourth extension of a second ground engaging element included in the header based on the distance to ground.

20. The method of claim 16, further comprising adjusting, via the processor, a second extension of a second ground engaging element included in the header based on the distance to ground.

* * * * *